(12) United States Patent
Blaser et al.

(10) Patent No.: US 7,937,288 B2
(45) Date of Patent: *May 3, 2011

(54) TARGETING OF ADVERTISEMENTS TO USERS OF AN ONLINE SERVICE

(75) Inventors: Shane Blaser, Westlake Village, CA (US); Sean Agnew, Thousand Oaks, CA (US); Namakal Kannan, Thousand Oaks, CA (US); Paul Ng, Westlake Village, CA (US)

(73) Assignee: NetZero, Inc., Woodland Hills, CA (US)

( * ) Notice: Subject to any disclaimer, the term of this patent is extended or adjusted under 35 U.S.C. 154(b) by 1168 days.

This patent is subject to a terminal disclaimer.

(21) Appl. No.: 11/535,938

(22) Filed: Sep. 27, 2006

(65) Prior Publication Data

US 2007/0022010 A1    Jan. 25, 2007

Related U.S. Application Data

(63) Continuation of application No. 10/835,853, filed on Apr. 30, 2004, now Pat. No. 7,181,415, which is a continuation of application No. 09/544,772, filed on Apr. 7, 2000, now Pat. No. 6,757,661.

(51) Int. Cl.
*G06Q 30/00* (2006.01)
(52) U.S. Cl. .................................. 705/14.49; 705/14.73
(58) Field of Classification Search ............... 705/14.49, 705/14.73, 14.54, 14.53
See application file for complete search history.

(56) References Cited

U.S. PATENT DOCUMENTS

| | | | |
|---|---|---|---|
| 5,105,184 A | 4/1992 | Pirani | |
| 5,305,195 A | 4/1994 | Murphy | |
| 5,319,455 A | 6/1994 | Hoarty | |
| 5,347,632 A | 9/1994 | Filepp | |
| 5,446,919 A | 8/1995 | Wilkins | |
| 5,504,675 A | 4/1996 | Cragun | |
| 5,636,346 A | 6/1997 | Saxe | |
| 5,643,088 A | 7/1997 | Vaughn | |
| 6,351,745 B1 | 9/1997 | Itakura | |
| 5,717,923 A | 2/1998 | Dedrick | |
| 5,721,827 A | 2/1998 | Logan | |
| 5,724,424 A | 3/1998 | Gifford | |
| 5,724,521 A | 3/1998 | Dedrick | |
| 5,740,549 A | 4/1998 | Reilly | |
| 5,761,662 A | 6/1998 | Dasan | |
| 5,768,521 A | 6/1998 | Dedrick | |

(Continued)

OTHER PUBLICATIONS

Brajnik, Giorgio and Carlo Tasso, "A Shell for Developing Non-Monotonic User Modeling Systems," California Digital Library International Journal of Human-Computer Studies. pp. 31-62. vol. 40.

(Continued)

*Primary Examiner* — Michael Bekerman
(74) *Attorney, Agent, or Firm* — SoCal IP Law Group LLP; Steven C. Sereboff; Mark A. Goldstein

(57) ABSTRACT

There is disclosed a server and local device that interface for selecting advertisements to be viewed by users of an online service based upon user activity. The local device preferably maintains a targeted activity list of activity identifiers and associated advertisements. The local device monitors the activity on the local device and compares the activity to the identifiers in the targeted activity list. If the activity matches one of the identifiers, the local device plays one or more advertisements.

18 Claims, 11 Drawing Sheets

U.S. PATENT DOCUMENTS

| | | |
|---|---|---|
| 5,781,894 A | 7/1998 | Petrecca |
| 5,794,210 A | 8/1998 | Goldhaber |
| 5,809,242 A | 9/1998 | Shaw |
| 5,823,879 A | 10/1998 | Goldberg |
| 5,838,790 A | 11/1998 | McAuliffe |
| 5,848,397 A | 12/1998 | Marsh |
| 5,854,897 A | 12/1998 | Radziewicz |
| 5,909,589 A | 6/1999 | Parker |
| 5,913,040 A | 6/1999 | Rakavy |
| 5,918,014 A | 6/1999 | Robinson |
| 5,933,811 A | 8/1999 | Angles |
| 5,946,646 A | 8/1999 | Schena |
| 5,946,664 A | 8/1999 | Ebisawa |
| 5,948,061 A | 9/1999 | Merriman |
| 5,959,623 A | 9/1999 | van Hoff |
| 6,009,409 A | 12/1999 | Adler |
| 6,009,410 A | 12/1999 | LeMole |
| 6,026,368 A | 2/2000 | Brown |
| 6,036,601 A | 3/2000 | Heckel |
| 6,055,513 A | 4/2000 | Katz et al. |
| 6,085,229 A | 7/2000 | Newman |
| 6,112,186 A | 8/2000 | Bergh |
| 6,119,098 A | 9/2000 | Guyot |
| 6,141,010 A | 10/2000 | Hoyle |
| 6,141,699 A | 10/2000 | Luzzi |
| 6,236,975 B1 | 5/2001 | Boe et al. |
| 6,327,574 B1 | 12/2001 | Kramen |
| 6,338,094 B1 | 1/2002 | Scott |
| 6,389,469 B1 | 5/2002 | Vekslar et al. |
| 6,463,468 B1 * | 10/2002 | Buch et al. ................... 709/219 |
| 2002/0073421 A1 * | 6/2002 | Levitan et al. ................. 725/28 |
| 2002/0095407 A1 | 7/2002 | Itakura |
| 2003/0023488 A1 | 1/2003 | Landsman |

OTHER PUBLICATIONS

Dedrick, Rick, "Interactive Electronic Advertising," IEEE Multimedia 1994, pp. 55-66 (Intel Architecture Labs), 1994.

Dedrick Rick, "A Consumption Model for Targeted Electronic Advertising," IEEE Multimedia, pp. 41-49, (Intel Architecture Labs), Summer 1995.

dotNow!, Letter (Aug. 31, 1999) from Harty to Fred Randall and press release (Sep. 23, 1999).

Lieberman, Henry, "Letizia: An Agent that Assists Web Browsing," M.I.T. Media-Lab Cambridge, MA, Aug. 1, 1995.

* cited by examiner

TARGETING OF ADVERTISEMENTS TO USERS OF AN ONLINE SERVICE

RELATED APPLICATION INFORMATION

This application is a continuation of U.S. patent application Ser. No. 10/835,853, filed Apr. 30, 2004, which is a continuation of U.S. Pat. No. 6,757,661 filed Apr. 7, 2000, both of which are incorporated herein by reference.

This application is related to U.S. patent application Ser. No. 09/393,391, filed Sep. 9, 1999, and U.S. Provisional Patent Application Serial No. 60/160,386, filed Oct. 15, 1999. Each of the aforementioned applications is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to the selection of advertisements and display of advertisements to a user of an online service.

2. Description of the Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection from the user's computer (or client) to the online service provider's host computers (or servers) and facilitates the user's interactions with the service.

In addition to managing the connection, there is provided software to display pages or screens relating to retrieved content according to views or presentations specific to the online service. This software may be integrated with the client application. The functionality of the content and the user interface (i.e., icons, dialog boxes, menus, etc.) for interacting with the content are typically dictated by various standards.

Interactions between the user's computer and the online service are facilitated by a variety of software protocols (i.e., communication conventions, rules and structures), including application level protocols, for managing the transfer of data across the network and to the client application on the user's computer. A protocol may be proprietary or exclusive to an online service such that only client software from the online service provider may be used to communicate with the server software. For example, an online service provider that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, may provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service provider because the web browser is, in fact, a separate client application displaying web documents containing presentation directives.

When using a browser, the browser issues HTTP messages to request web pages. A requested web page is typically identified using its URL—uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well known in the art and is not discussed further herein.

In some portions of this disclosure, the term "resource locator" is used. The term is defined as a string or code which uniquely identifies a resource on a network. Thus, the URL is a species of resource locator.

There are a number of types of online service providers (OSPs). Online services may serve the general public or may serve a limited class of individuals. Some public OSPs utilize proprietary networks; America Online and @Home are examples. Other public OSPs use the public networks, and most Internet Service Providers (ISPs) are an example. OSPs often provide Internet access. Internet access is the primary service provided by some OSPs, most notably ISPs.

Users typically connect to an OSP using a computer with a communications device such as an analog modem, an Ethernet adapter, DSL adapter or cable modem. Such connections may be analog or digital, dial-up or constantly-connected. Subscribers typically pay a fee for their subscriptions to OSPs. These fees typically are in the form of a sign-up fee, plus online charges which are fixed (i.e., unlimited monthly access for a fixed fee) or based upon the amount of time the user is connected to the online service. The fees generally increase with bandwidth.

Some online service providers have derived revenue by displaying advertisements for third parties (hereinafter, "advertisements") to users. For example, when a user accesses a web page on the Web, an advertisement may be displayed to the user as part of the web page. Advertisements are also shown to users of some proprietary online services. Typically in such systems, each user accessing a certain screen or site is shown the same advertisement. Sophisticated systems have the capability to change the advertisement after a certain period of time.

Some attempts have been made to provide advertising-supported online services, including Internet access, on a free or heavily discounted basis. Typically, these online services required the user to use a special client application for connecting to the online service. The client application typically causes an advertising window to be displayed on the user's display. This advertising window remains visible and on top of other windows throughout the entire online session. The client application receives advertisements one at a time from the online service provider, and the client application displays the advertisements in the advertising window. It is unknown to the inventors, however, whether the transmission of advertisements from the online service provider to the client application is initiated by the online service provider or the client application, how the online service determines which advertisements to send to the users, and whether such typical client applications do anything more than open the communications link with the online service and display advertisements.

In one advertising based Internet service called Bigger.net, the client application periodically requested new advertisements from an ad server. A host computer monitored the time between such requests and terminated the connection if a preset period of time was exceeded. Bigger.net also had the ability to monitor network activity, though it is unclear how this was done.

Other advertising-supported online services have included: CyberFreeway, which used a client application developed by HyperNet, Inc. of Tokyo, Japan; Juno Online, which provided free email; Tritium and Freewwweb.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For typical online systems and networks, including the Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

It is believed that the prior art advertising-supported online services did not have the ability to target advertisements. Furthermore, their client applications are believed to have been limited in capabilities.

SUMMARY OF THE INVENTION

In accordance with the present invention, there is provided an ad server application that selects advertisements to be viewed by users of an online service. The ad server application receives information about the users and information about the desired audience for the advertisements. The ad server application performs a best-fit match between the users and the advertisements. The selected advertisements are then displayed to users in an order selected by the ad server application, and based upon the performance of the advertisements, the ad server application refines the best-fit matches and the display order for the users.

In certain circumstances, the ad server automatically transmits certain advertisements for immediate display in real time. In one such circumstance, the ad server determines whether any advertisements are exhibiting a good response from users of a given demographic category. If the advertisement is receiving a good response from users of a given demographic category, then the ad server automatically causes the advertisement to be displayed to users of a similar demographic category. Advertisements that are exhibiting a poor performance with users may also be given special attention. Such advertisements are increased in rotation or prominently displayed to the user in an attempt to generate user response to the advertisement.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of an embodiment of the invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The System of the Invention

The system of the invention enables data, such as advertisements, to be sent to users based upon: the user's geographic location; the user's interactive data; the user's network usage data; the user's personal profile information; the scheduling requirements of the data to be sent; and the demographic requirements of the data to be sent. As used herein, the term "demographic" is used to refer to various characteristics that define the user. A user's demographic profile may be divided into various categories including, but not limited to, geographic location, age, occupation, gender, marital status, and psychological characteristics such as interests and hobbies.

Figure 1:
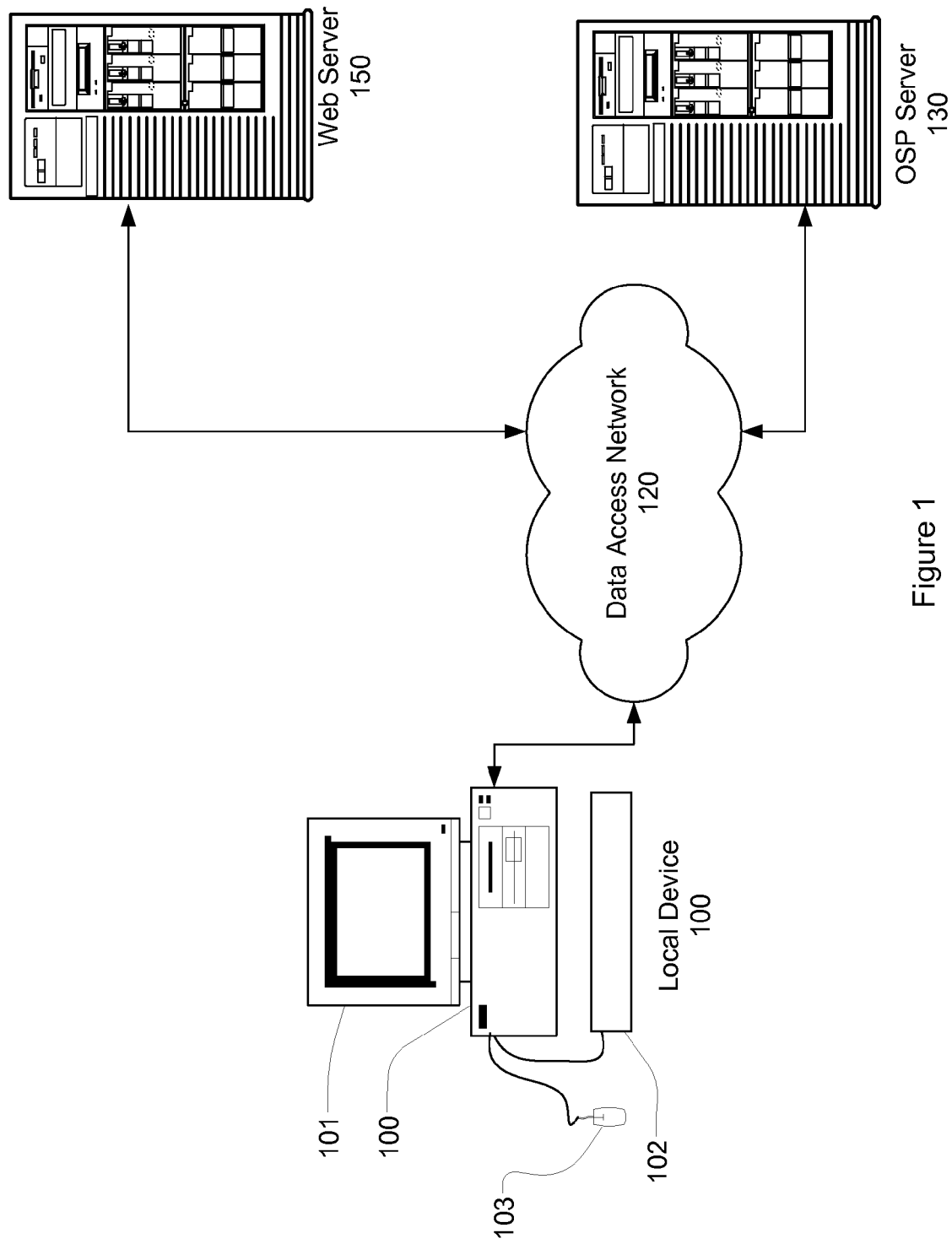
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, an OSP server 130 and a web server 150. The local device 100, the data access network 120 and the OSP server 130 comprise the network data distribution system. The local device 100 is provided online service to the network data distribution system under control of the OSP server 130. An online service provider controls the OSP server 130.

The local device 100 preferably comprises a client computer that is configured to access the OSP server 130 via the local access network 120. The client computer may be, for example, a PC running a Microsoft Windows operating system. The local device 100 preferably includes an output device, such as display 101, and an input device, such as keyboard 102 and/or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with online service, including the OSP server 130 and the web server 150. The data access network 120 preferably comprises a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages available to the local device 100. Thus, for example, the web server 150 could be accessible from the Internet, or it could be a part of an intranet and represents any number of web servers.

The OSP server 130 preferably is a computer system, such as a server computer. Alternatively, the OSP server 130 may be considered to represent a number of physical devices which as a group provide the indicated network services. For example, the OSP server 130 could include a dedicated advertisement server that processes advertisement-related data. The OSP server 130 acts as a recipient of certain information transmitted by the local device 100, as described further below. The OSP server 130 preferably also transmits certain data to the local device 100 as described further below.

Figure 2:
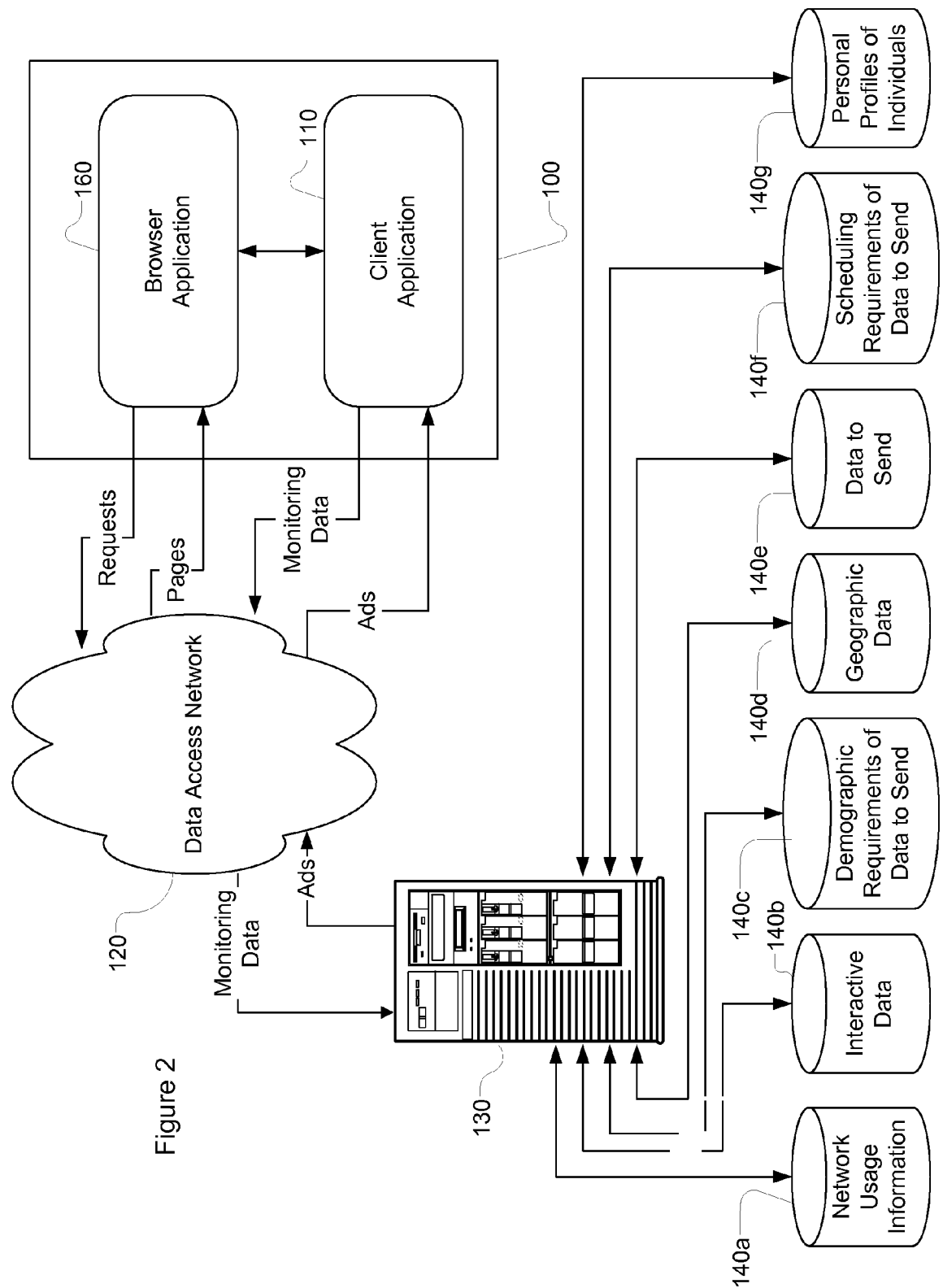
FIG. 2 is a second block diagram of a network data distribution system in accordance with the present invention.

Referring now to FIG. 2, there is shown a block diagram of a network data distribution system of an online service in accordance with the present invention. The system comprises a client application 110, the data access network 120, the OSP server 130 and data stores 140a-g (collectively, 140). A browser application 160 is also shown. A "browser application" is software that provides interactive utilization of hypertext objects located on a network, such as web pages on the Internet. As used herein, "browser application" also includes most email clients and ftp clients. The client application 110 is a program operative on local device 100, and preferably an independent application program or a DLL. The client application 110 preferably retrieves certain network data, displays certain network data, transmits geographic location data, transmits interactive user data, transmits network usage data and transmits personal profile information as described below. The client application 110 preferably also sets up and provides access to the online service. The data stores 140 store and provide this geographic information data 140d, network usage data 140a, interactive usage data 140b, personal profile information 140g, data to be sent 140e, schedule for transmitting data 140f and demographics for transmitting data 140c.

The browser application 160, such as Microsoft Internet Explorer or Netscape Navigator is preferably installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the client application 110 and the OSP server 130 establish a session. In this session, the client application 110 transmits certain information regarding the user of the local device 100 and his use of the local device 100 while connected to the online service. The OSP server 130, on the other hand, uses the information from the client application 100 to determine information which should be sent to the client application 110. Preferably, the information from the client application 110 is used by the OSP server 130 to select advertisements which the local device 100 should display. The client application 110 then causes these advertisements to be displayed on the local device's output device 101.

The information from the client application 110 regarding the user preferably includes geographic data and personal profile information. Geographic data indicating the user's current location preferably is sent from the client application 110 to the OSP server 130, which then stores the geographic data in the data store 140d. This geographic data can be something simple, like a phone number. The user preferably provides personal profile information on a periodic basis which is stored in the data store 140g and used by the OSP server 130. This information consists of (but is not limited to) things such as: age, sex, marriage status, home address and personal interests.

The information regarding the user's use of the local device 100 includes email usage, web usage and advertisement click-throughs. The user's interactions and feedback with the web server 150 provided through the browser application 160 are preferably captured by the client application 110, analyzed by the OSP server 130 and stored in the data store 140b. This includes the user's feedback and responses to the data delivered to the browser application 160. The user's activities on the web server 150 provided through the browser application 160 are preferably captured by the client application 110, analyzed by the OSP server 130 and stored in the data store 140a. This includes the type of network data the user requests and accesses. This data is preferably summarized and classified into multiple demographic profiles.

The data to be sent to users preferably has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
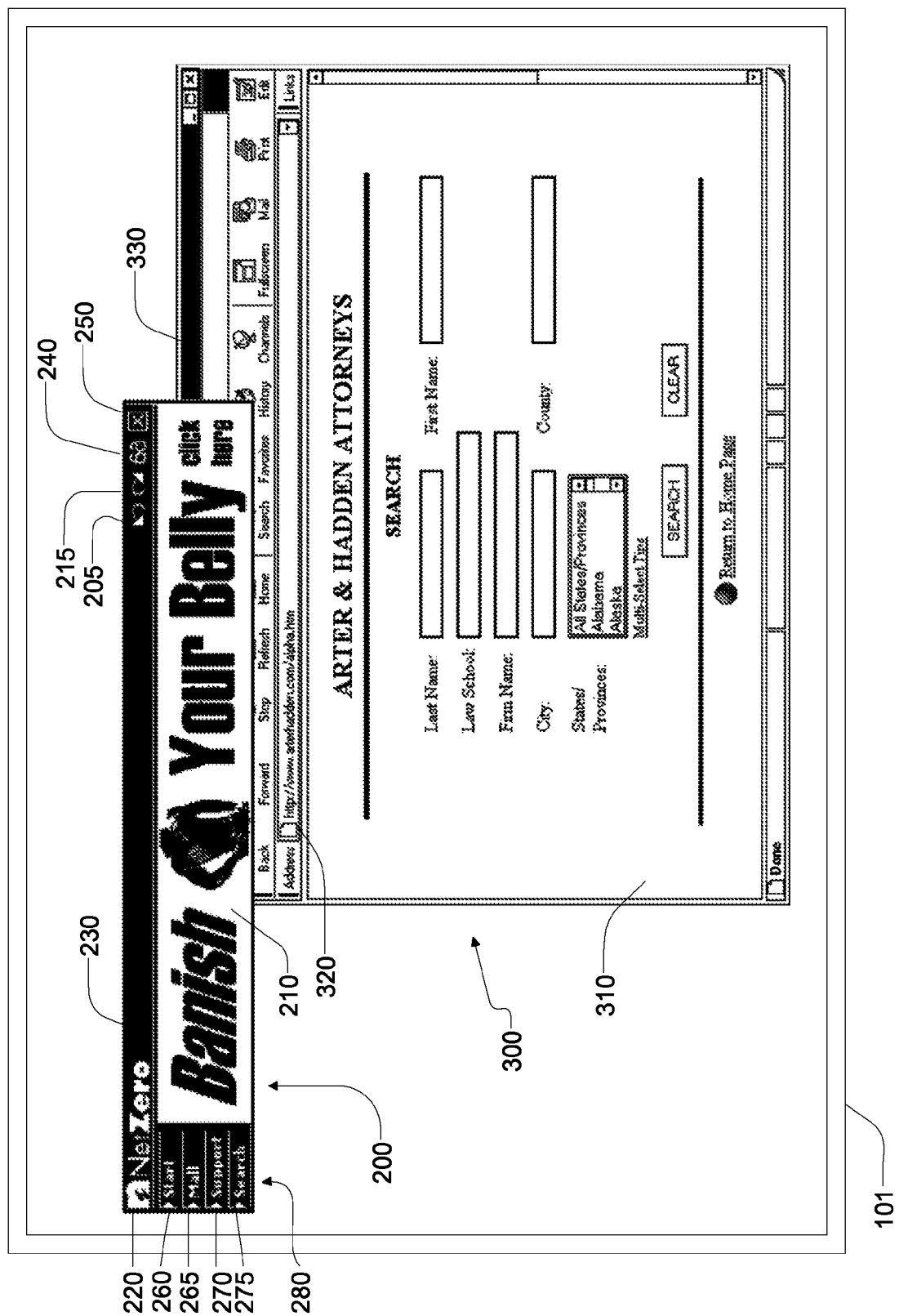
FIG. 3 is a representation of a display of a local device having a client window and a browser window.

Referring now to FIG. 3, there is shown the display 101 having a client window 200 and a browser window 300. The client window 200 is generated and controlled by the client application 110. The browser window 300 is generated and controlled by the browser application 160, here Microsoft Internet Explorer. The browser window 300 is familiar to those skilled in the art, so the particulars are not described further herein. Further information regarding the use of most browser applications and their technical specifications is abundantly available.

The client window 200 includes a title bar 230, an advertising pane 210, a number of operational icons 205, 215, 220, 240, 250 on the title bar 230, and a number of button bar icons 260, 265, 270, 275 on a button bar 280. The title bar 230 preferably identifies the name of the OSP. The advertising pane 210 is a space in which the client application 110 displays advertisements. The client window 200 and the advertising pane 210 are shown having a conventional rectangular shape. However, the client window 200 and the advertising pane 210 may define any of a wide variety of regular or irregular shapes.

The button bar icons 260, 265, 270, 275 preferably provide one-click access to Web pages and / or menus that might be useful to the user. The online service provider can sell the button bar icons to third parties as an additional revenue source. These icons 260, 265, 270, 275 are associated with particular URLs. In the illustrated example, the icon 260 is associated with a start page. The icon 265 is associated with an online shopping mall page. The icon 270 is associated with an online technical support page from the online service provider, and the icon 275 is associated with an online search engine page. By clicking on any of these icons 260, 265, 270, 275, the client application 110 causes the browser application 160 to load the Web page having the URL associated with the selected icon.

The operational icons 205, 215, 240, 250, 280 on the title bar 230 preferably provide one-click access to operational features of the client application 110. As explained below, the client application 110 maintains records of the advertisements that have been displayed. The cycle back icon 205 allows the user to review advertisements which were previously displayed by the client application 110, in the reverse order in which the advertisements were displayed. If the user has cycled back through advertisements, the cycle forward icon 215 allows the user to review advertisements in the order in which the advertisements were displayed by the client application 110. The search icon 240 provides convenient access to online searching facilities. The close icon 250 causes the client window 200 to close, and thus also causes the session with the online service to terminate.

The client application 110 preferably provides access to a menu of additional menu items and functions. The menu preferably provides alternative and enhanced access to the features associated with the button bar icons 260, 265, 270, 275 and the other operational icons 205, 215, 240, 250. In addition, the client application 110 preferably provides the user with the ability to hide or show the title bar 230 and / or the button bar 280. The client application 110 preferably also allows the user to access and edit his profile. The user is preferably also provided with the option of positioning the client window 200 at any of a number of predefined positions, such as top left corner of the display 101, top right corner, bottom left corner, or bottom right corner.

The browser window 300 includes a display pane 310, an address bar 320 and a title bar 330. The display pane 310 is a region of the browser window 300 wherein the browser application causes web pages received by the browser application to be displayed. The address bar 320 is another region of the browser window 300 and the browser application displays URLs in the address bar 320 corresponding to the web page currently displayed in the display pane 310. The user can also enter a URL into the address bar 320, and the browser application will attempt to load the web page or other object to which the entered URL points. The primary feature of the title bar 330 is that it displays the title of the browser application. Another feature of most browsers is that the title bar 330 displays the title of the web page then displayed in the display pane 310.

The client window 200 is displayed on top of the browser window 300. Preferably, the client window 200 remains visible and on top of all other windows so long as the communication channel to the OSP server 130 is open. The client application 110 preferably can control the location of the client window 200 on the display 101. For example, the client application 110 preferably allows the user to select one of several predefined locations for the client window 200, such as lower left corner, upper right corner, etc. Some operating systems such as Microsoft Windows permit windows to be moved to the edge of the display 101 so that only a small portion of the window is visible. The client application 110 preferably can also prevent the client window 200 from being moved off of the visible area of the display 101. When the user attempts to hide all or a part of the client window 200, the client application preferably moves the client window 200 to a fully visible area of the display 101.

Methods of the Invention

Figure 4:
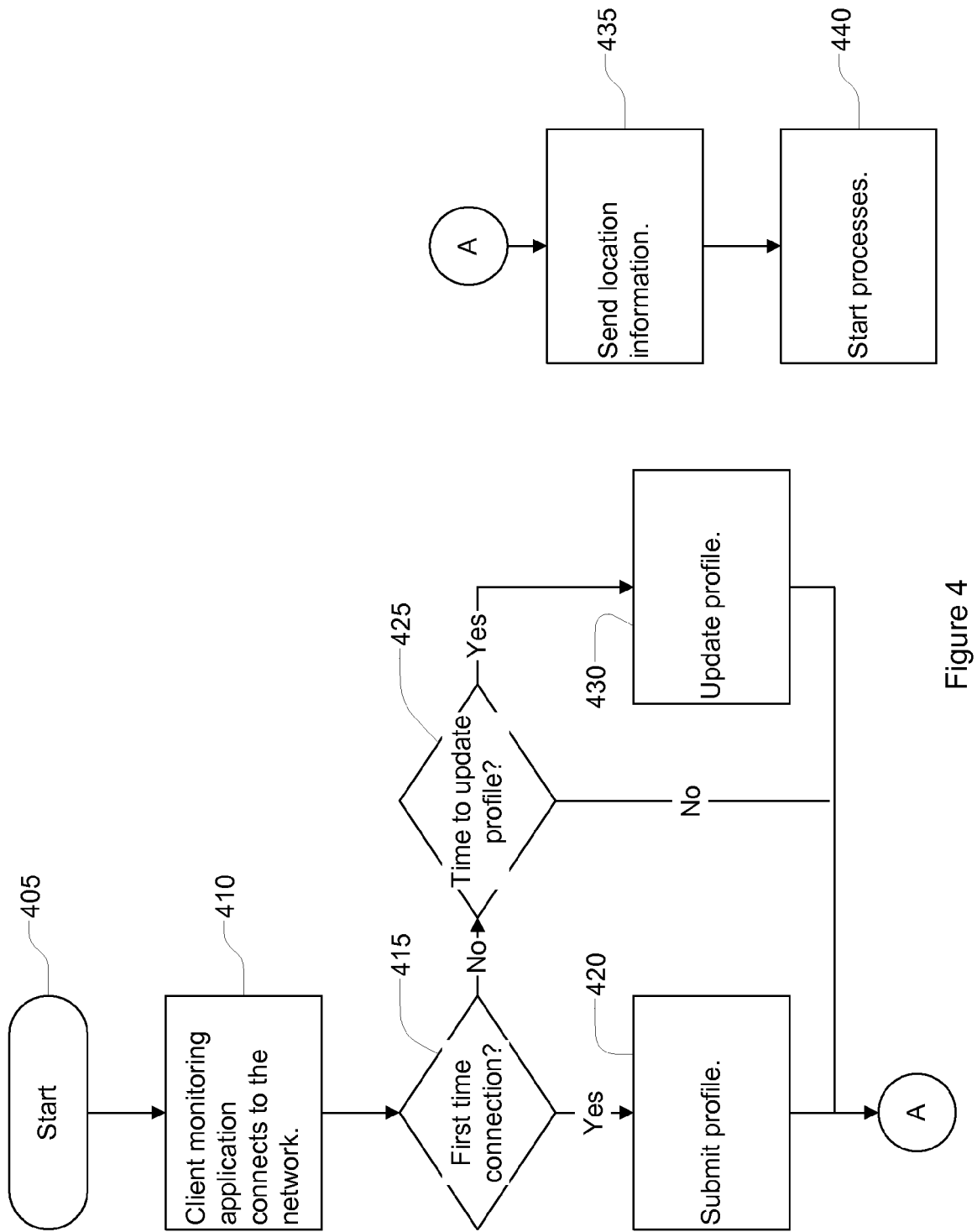
FIG. 4 is a flow chart of a method of monitoring web browsing by a user in accordance with the invention.

Referring now to FIG. 4, there is shown a flow chart of a method of distributing data in a network in accordance with the invention. The components 110, 120, 130, 140 work together to deliver data that meets the geographic and demographic criteria.

After the method begins (step 405), the user preferably uses the client application 110 to connect to the data access network 120, and then the OSP server 130 (step 410). The particular manner of the connection depends on the network infrastructure underlying the connections. The important aspect of this step 410 is that a communications channel is established between the client application 110 and the OSP server 130. By "communications channel," it is meant a logical path for data transmission. The OSP server 130 preferably acts as a gatekeeper to the online services. Only after the OSP server 130 has authorized access can the local device 100 access the web server 150 and the other resources of the online service.

The communication channel may be of two varieties - dial-up or constant-connection. In a dial-up communication channel, the connection to the online service becomes available only after the local device 100 creates a physical link to the online network and then a logical link to the online network. For example, the local device 100 has a -up communication channel if the local device 100 has a modem and connects through tone dialing to the online service using the PSTN. In a constant-connection communication channel, the connection to the online service is always available to the local device 100, and the local device need only create a logical link to the online network. For example, the local device 100 has a constant-connection communication channel when the local device 100 has a cable modem and connects to the online service using a cable service.

If this is the first time the user has connected (step 415), then the OSP server 130 preferably requires the user to use the local device 100 to submit personal profile information (step 420). Preferably, the OSP server 130 periodically will request (step 425) that the client application 110 have the user update this profile (step 430).

Each time the local device 100 connects to the OSP server 130, the OSP server 130 preferably obtains data indicating the local device's current geographic location (step 435). This geographic information is preferably derived from a local access phone number used by the client application 110 to connect to the data access network 120, and the client application 110 transmits its local access phone number to the OSP server 130 for geographic determination purposes.

Once connected, a number of processes are preferably started (step 440). In one of these processes, whenever the user interacts with data received on the client application 110, the client application 110 sends feedback information respecting this interaction to the OSP server 130. The OSP server 130 then summarizes and classifies the feedback information into demographic profiles stored in the data store 140.

In another of these processes, whenever a user uses the browser application 160 to request or access data from the web server 150, the client application 110 sends feedback information respecting these requests and data accesses to the OSP server 130. The OSP server 130 then summarizes and classifies this feedback information into the demographic profiles in the data store 140.

In another of these processes, while a user's local device 100 is connected to the web server 150, the OSP server 130 determines which targeted data needs to be sent to the client application 110 and then transmits this targeted data to the client application 110. The OSP server 130 accomplishes this by:

examining the scheduling requirements to determine which data needs to be sent;

examining the demographic requirements of the data to determine to which demographic profiles the data needs to be sent;

selecting the users who are currently connected that meet the demographic requirements of the data; and sending the data to the selected users.

As mentioned, one of the processes relates to the display of data, and particularly advertisements, in the client window 200. The process preferably operates in conjunction with a database stored within the data stores 140. The following description is one way of embodying the database, and others are within the scope of the invention.

geographic information data 140*d*
network usage data 140*a*
interactive usage data 140*b*
personal profile information 140*g*
data to be sent 140*e*
schedule for transmitting data 140*f*
demographics for transmitting data 140*c*.

Various information about users of the online service are stored in the data stores 140. The OSP server 130 preferably creates records for each user when the user submits a personal profile during the first-time connection to the data access network 120. Additionally, the OSP server 130 preferably regularly updates the user information table in response to monitored user activities on the web server 150 and OSP server 130, including the type of network data the user requests and accesses, and the user's responses to advertisements displayed by the client application 110 by instructions from the OSP server 130.

A set of Advertiser or sponsor tables includes information about each organization that desires to have content-area advertisements transmitted to users. A Product table preferably exists for each product that the advertiser wishes to promote. Each Product table is preferably associated with at least one Advertisement table that includes information about the advertisement to be displayed to the user, including criteria fields relating to the demographic category or categories to which the advertisement is sent. The target criteria may be divided into several categories, such as geographic location, age, gender, marital status, hobbies, occupation, etc. The target criteria fields preferably each have corresponding fields in the User Information table. The Advertisement table may also include preferred times of day at which the advertisement is displayed to users.

There is also an Ad Performance table associated with each Advertisement table containing data relating to the performance of the advertisement. The Ad Performance table preferably contains data relating to usage and response to the advertisement, such as which user demographic categories have clicked-through the advertisement, the times of day of the click-throughs, the number of click-throughs by each demographic, types of merchandise purchased, purchase volume, questionnaire or survey responses, commerce transaction information, search data, browse data, shopping cart activities, and other information gathered or collected following the display of an advertisement. This type of information may be obtained by monitoring usage by each user, as described in the above-referenced related applications.

The OSP server considers the advertisements for transmission and display to the user once the advertiser has established advertising records.

Figure 5:
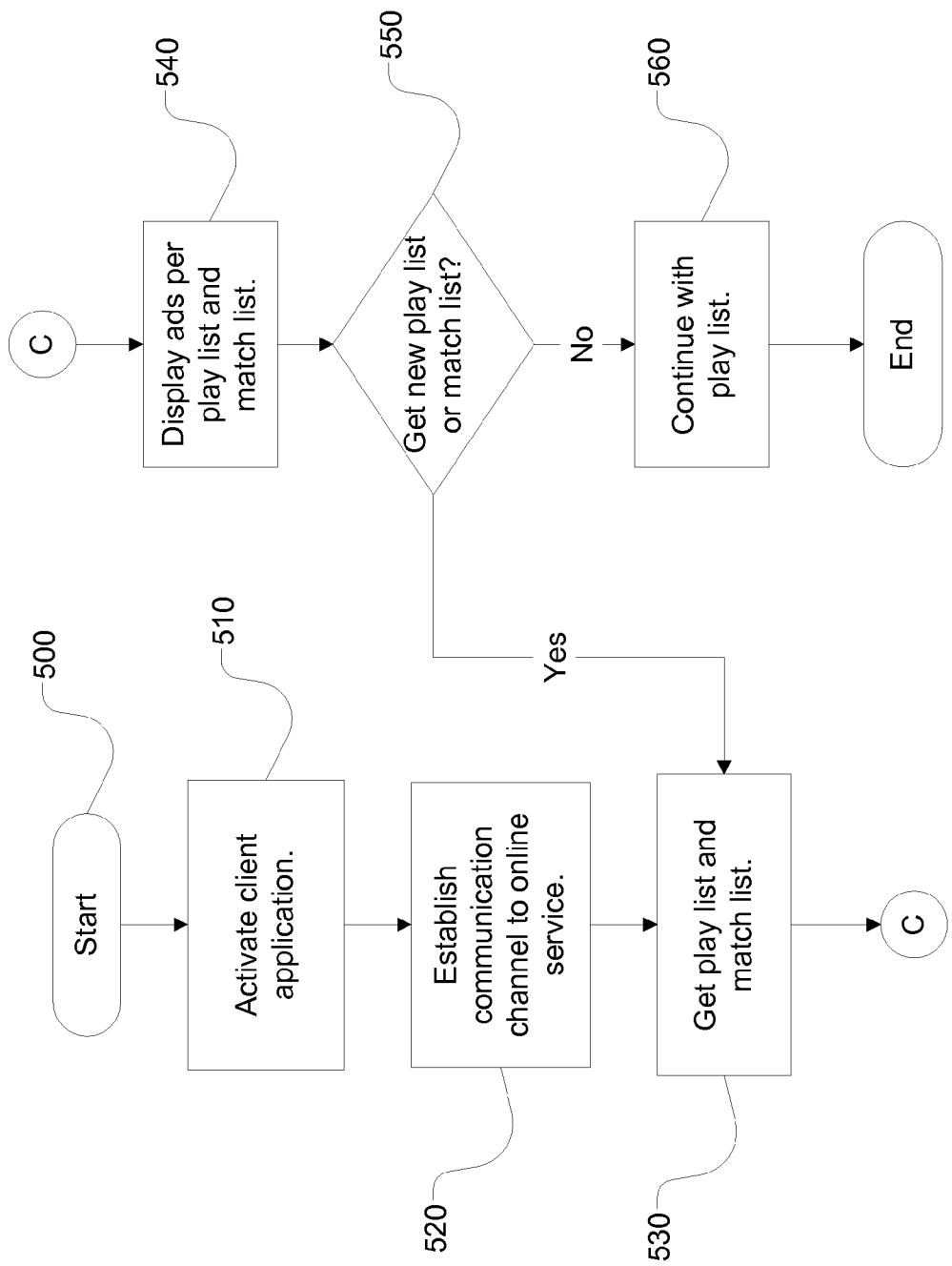
FIG. 5 is a flow chart of a method of displaying advertisements to a user of an online service in accordance with the invention.

Referring now to FIG. 5, there is shown a flow chart of a method of displaying advertisements to a user of an online service in accordance with the invention. This method generally involves the display of advertisements that are dynamically targeted toward the user based upon the user's demographic profile, geographic profile, and usage history.

After the method begins (step 500), the client application is activated (step 510). The client application 110 may be installed during manufacture of the local device 100, during use of the local device 100 at the instigation of the user, or may occur automatically as a consequence of other processes. Furthermore, the client application 110 may be activated either manually or automatically. Although at least some aspects of the client application 110 should be operable from the local device 100, the client application 110 need not be stored on the local device 100 and can be run from a remote location.

In the next step (step 520), the client application 110 establishes a communication channel to the online service.

With the communication channel established, the client application 110 receives an advertisement play list from the OSP server 130 (step 530). The play list comprises one or more ad objects. The ad objects are preferably data constructs which each include a resource locator of an advertisement to be displayed, a resource locator to be accessed if the user clicks on (or otherwise selects) the advertisement when displayed in the ad pane 210, and a number of attributes for the display of the advertisement. The play list preferably specifies an order in which the advertisements identified in the play list are to be displayed. Additionally, the play list specifies the amount of time that each advertisement is to be displayed.

Typically, advertisements in the online industry are associated with a resource locator, and more typically with a URL. As is well known, when a user uses his pointing device 103 to click on an online advertisement in a browser's window such as browser window 300, the browser application loads the resource at the associated URL. This is commonly known as "click-through." In accordance with the invention, if during the display of an advertisement in the ad pane 210, the user clicks-through on the advertisement, then the client application 110 causes the resource locator associated with the advertisement to be loaded by the browser application 160. If the browser application 160 is not open at the time, then the browser application 160 is first opened and then pointed to the resource locator associated with the advertisement. If the resource locator is not for a web page, the client application 110 or some other software in the local device 100 preferably causes the appropriate application to open so that the resource locator may be opened.

After the client application 110 receives the play list (step 530), the client application 110 displays advertisements in the client window 200 in accordance with the on-line play list (step 540). The client application 110 may also display advertisements in the client window 200 prior to and during establishment of the communication channel in accordance with a logon play list, as described in the above-referenced related application.

The client application 110 periodically determines whether to obtain a new play list from the OSP server 130 (step 550). The client application 110 may automatically download a new play list upon the occurrence of certain events such as after the last advertisement in the play list has been displayed or at predetermined time intervals. The OSP server 130 may also automatically prompt the client application 110 to obtain a new play list upon the occurrence of certain events such as after a new, targeted play list is compiled, as described below. If circumstances warrant obtaining a new play list, then the client application 110 obtains an updated play list from the OSP server 130 (step 530).

In any event, the client application 110 continues to display ads in accordance with the play list while the user uses the online service (step 560).

The OSP server 130 preferably compiles a separate play list for each user of the online service. Each user-specific play list contains advertisements that are particularly targeted toward the corresponding user based upon user-specific characteristics such as the user's demographics and usage history.

Figure 6:
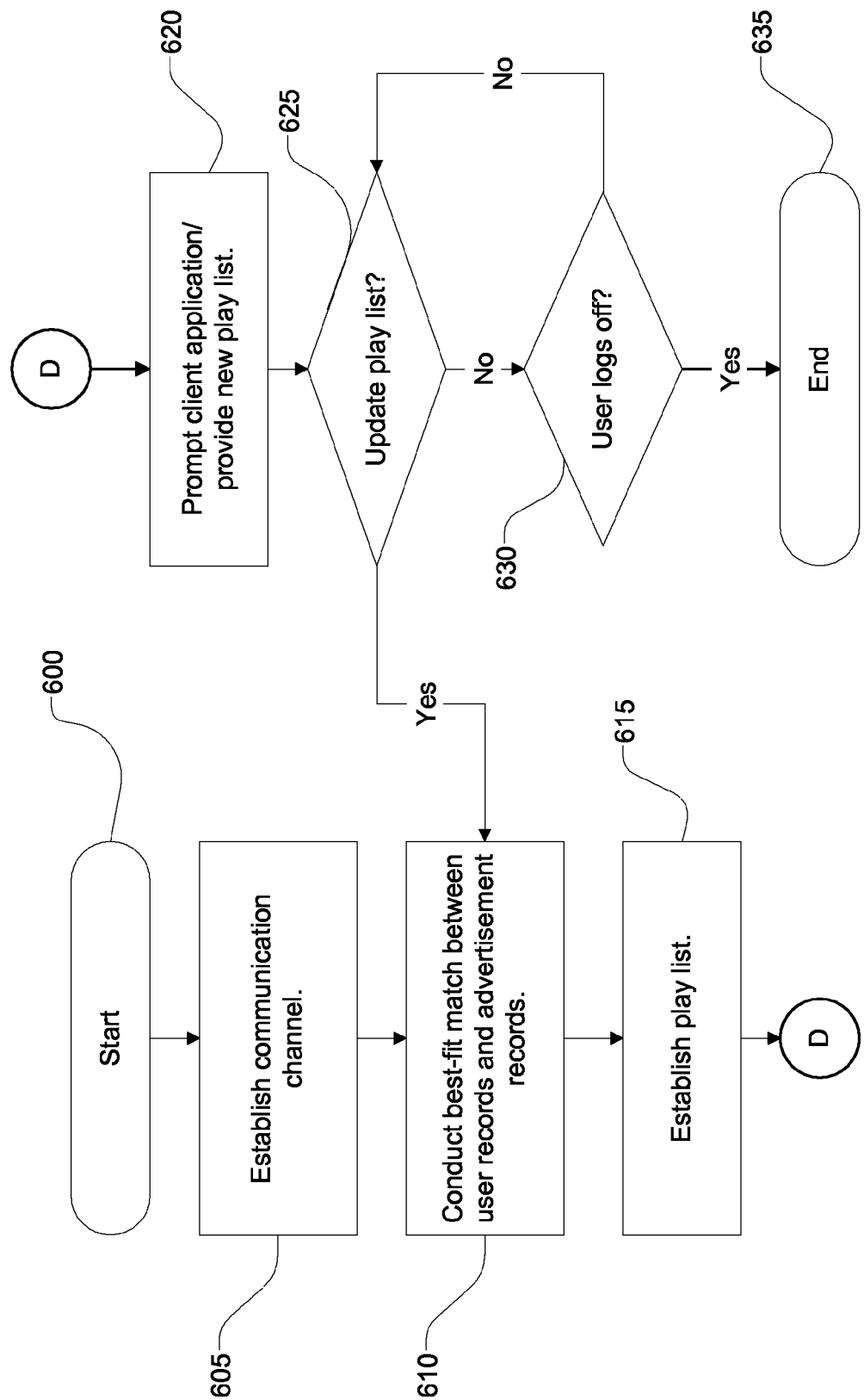
FIG. 6 is a flow chart of a method of assembling a list of targeted advertisements for a user of an online service in accordance with the invention.

With reference to FIG. 6, the ad targeting capabilities of the OSP server 130 are described. After the method begins (step 600), the client application 110 establishes a communication channel with the network (step 605). In the case of a dial-up connection, an online session commences when the client application 110 establishes a communication channel via a PSTN from the local device 100 to the OSP server 130. The online session terminates when the communication channel is closed, or when the client application "hangs up" the connection.

In a constant-connection communication channel, the client application 110 does not actually create or terminate the communication channel, which is always on. In the case of a constant connection, establishment of a communication channel (step 910) preferably comprises the client application 110 transmitting a request to the OSP server 130 to authorize the local device 100 to interact with the web server 150. The online session then commences when the OSP server 130 provides such authorization. The online session terminates (step 945) when the OSP server 130 removes such authorization, preferably at the request of the client application 110.

The OSP server 130 conducts a correlation or match between the user and the pool of available advertisements (step 610). The advertisement correlation is preferably initially performed whenever the client application 110 establishes a communication channel with the OSP server 130.

The OSP server 130 performs a best fit-analysis between the user and the available advertisements and compiles a list of advertisements that are particularly suited for the user. The best-fit analysis is preferably performed by determining field matches between the Advertiser tables and the User tables in conjunction with a predetermined field priority schedule. A set of best-fit advertisements for the user is then compiled by the OSP server 130.

The OSP server 130 then establishes a play list for the user (step 615) comprised of one or more of the advertisements selected in the best-fit analysis. The order of the advertisements in the play list may be arbitrarily determined. Alternately, the order may be determined according to a priority protocol that is preferably related to the user's usage history with the network. Preferably, advertisements related to subject matter that the user commonly requests or accesses data on are placed at the top of the play list. The play list preferably also includes at least one randomly selected advertisement that may or may not be related to the user's demographic profile to allow for random testing of advertisements with the user. However, the quantity of randomly-selected advertisements is preferably minimized so as not to interfere with the provision of targeted advertisements.

The play list preferably includes several advertisements compiled from the general profile of the user determined over the user's entire history with the online service. However, the play list could also comprise a single advertisement that is specially selected for the user based only upon the user's most-recently monitored activities on the web server 150, including the type of network data the user is requesting during the current online session. For example, if, during the online session, the user is requesting or searching for data relating to automobiles, then the play list preferably comprises an automobile-related advertisement. The advertisement may include a special banner notifying the user that the advertisement was specially selected to assist the user in gathering information during the online session. Preferably, this will bolster the user's confidence in the advertisement display process so that the user has an increased tendency to review the advertisements in the client window 200.

In any event, the OSP server 130 next provides the client application 110 with the new play list (step 620). Preferably, the OSP server 130 prompts the client application 110 to download a play list whenever the play list has been updated. In this manner, the user is regularly provided with an updated, optimized play list.

For a given user, the OSP server 130 periodically determines whether to compile an updated play list (step 625). The OSP server 130 may be configured to automatically update the play list upon the occurrence of certain events, such as when the targeting criteria of the advertisement records undergo a change. The OSP server 130 may also be configured to automatically update the play list at predetermined time intervals. The client application 110 may also prompt the OSP server 130 to update the play list when the current play list is at or near the last advertisement in the play list.

If circumstances warrant that the play list should be updated, then a new play list is formulated based upon a best-fit match between the user and the advertisement records (steps 610 and 615). This process continues until the user logs off of the network (steps 630, 635).

Figure 7:
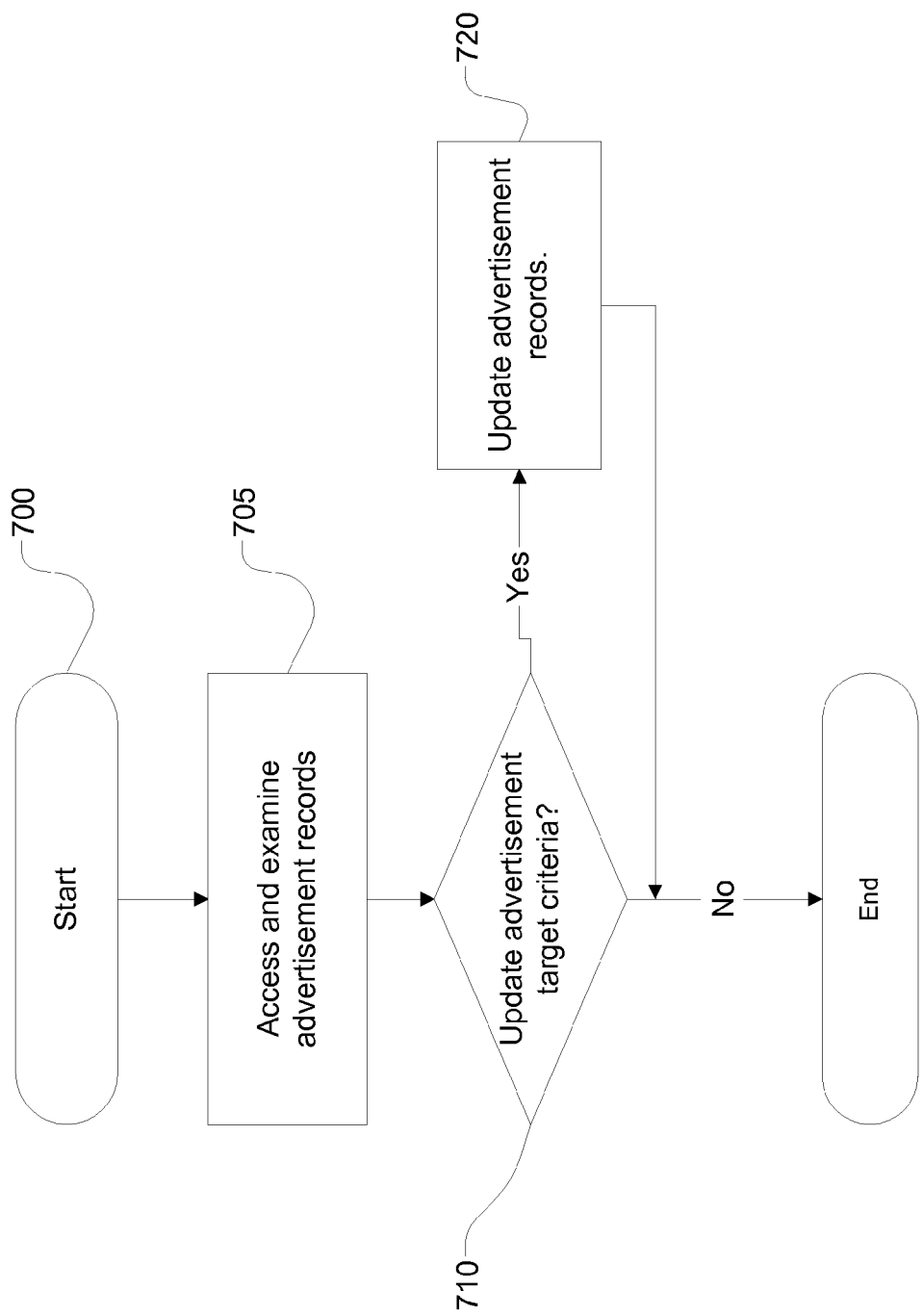
FIG. 7 is a flow chart of a method of optimizing advertisement targeting criteria in accordance with the invention.

Referring now to FIG. 7, there is shown a flow chart of a method of dynamically optimizing an advertisement's targeting criteria based upon the performance of the advertisement. After the method begins (step 700), the OSP server 130 accesses the records from the data stores 140 relating to the performance and target criteria for a given advertisement (step 705). The OSP preferably compares the performance records in the Ad Performance table with the target criteria in the Advertisement table to ascertain whether the target criteria should be refined based upon the monitored performance of the advertisement.

Based upon this comparison, the OSP server 130 then determines whether to update the target criteria in the Advertisement table for the given advertisement (step 710). The OSP server 130 may use various criteria to determine when to modify an advertisement's target criteria. One such criterion relates to the demographic categories that have performed click-throughs on the advertisement. The OSP server 130 preferably updates the advertisement's target criteria if a predetermined quantity of users of a given demographic category have performed click-throughs on the advertisement and that demographic is not included in the advertisement's target criteria (step 720). The Advertisement table is revised to include the non-included demographic category as target criteria.

For example, the comparison between the advertisement performance records and the advertisement target criteria records may indicate that users of an 18-24 year-old age group commonly click-through the advertisement but that age group is not included in the target criteria for the advertisement. The OSP server then updates the Advertiser table to include the 18-24 year-old age group under target criteria. The advertisement is thereafter targeted to 18-24 year-old users.

Another criterion for updating an advertisement's target criteria is the times of day that users perform click-throughs on the advertisement. The performance records of the advertisements may indicate that the advertisement receives a high number of click-throughs at certain hours of the day. The Advertisement table is preferably updated so that the rotation of the associated advertisement is increased during those hours of the day.

The target criteria for a given advertisement is preferably also updated when the corresponding performance records indicate that the advertisement is performing poorly, such as if the advertisement receives little or no click-throughs from the target audience, or if the advertisement receives little or no click-throughs at certain hours of the day. In this case, the OSP server 130 preferably modifies the target criteria of the advertisement to include additional demographic categories that may or may not be related to the current target demographic categories. The OSP server 130 may also modify the display hours of a poorly-performing advertisement to increase its rotation and thereby pique user interest.

The target criteria for each advertisement is preferably regularly modified to at least temporarily include randomly-selected demographic categories. This will allow the advertisement to be periodically displayed to random users, thereby allowing the advertiser to monitor the performance of the advertisement with new audiences and perhaps expand the scope of the advertisement.

The OSP server 130 preferably automatically performs the advertisement targeting optimization method on a regular basis for each advertisement record in the data stores 140. The OSP server 130 may be configured to perform the process at times when online usage is traditionally below peak levels, such as during the middle of the night.

In certain circumstances, the OSP server may automatically transmit at least one advertisement to a user's local device 100 for immediate, real time display to a user, rather than for display as part of a play list. Such an advertisement is referred to herein as a "real time advertisement," which is an advertisement that the OSP server 130 automatically transmits to the local device 100 of one or more users for immediate display.

Figure 8:
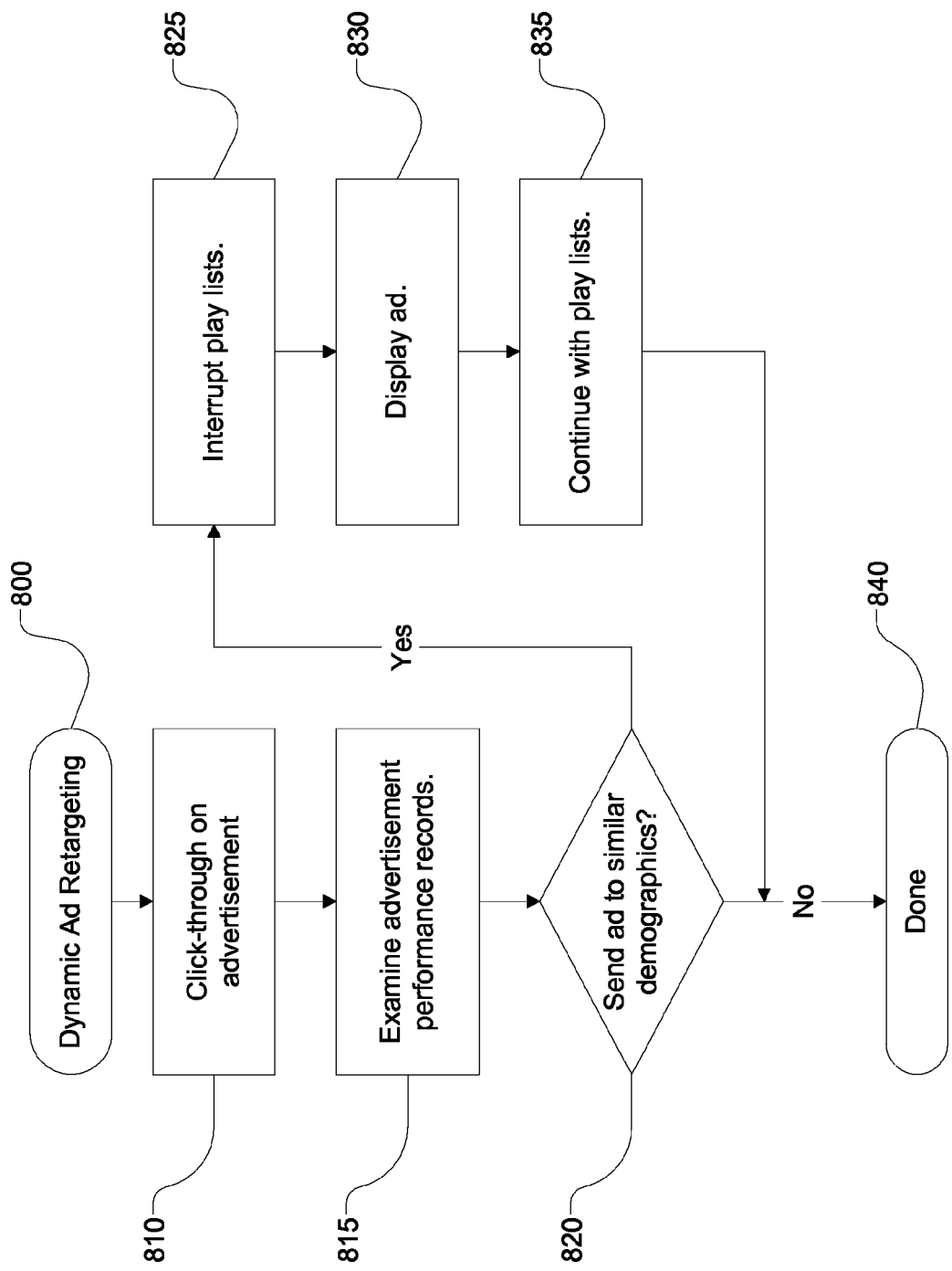
FIG. 8 is a flow chart of a method of dynamically re-targeting advertisements to users of online service in accordance with the invention.

Certain advertisements may exhibit such a strong performance with online users of a certain demographic category to warrant sending the advertisement as a real time advertisement to other users of the same or similar demographic category. With reference now to FIG. 8, there is shown a flow chart of a method of displaying an advertisement as a real time advertisement to users of a given demographic category if the advertisement exhibits a strong response from other users of the same or similar demographic category. (dynamic ad rertargeting, step 800)

The method begins when a user performs a click-through on an advertisement (the "subject advertisement") (step 810). The OSP server 130 then accesses and examines the performance records for the subject advertisement and ascertains whether the subject advertisement has received a good response from users of the same or similar demographic category or categories as the current user (step 815). Preferably, each demographic category is associated with a set of predetermined demographic categories that are deemed to be similar categories.

The criteria for whether an advertisement has received a "good response" from a demographic may vary. Some possible criteria are: the total number of click-throughs on the advertisement by users of that demographic, click-throughs on the advertisement as a percentage of total number of click-throughs on all advertisements, or number of click-throughs within a given time span.

Based upon the analysis of the subject advertisement's performance records, the OSP server 130 next determines whether the advertisement should be displayed as a real time advertisement to users of the same or similar demographic category as the current user (step 820). If it is determined that the subject advertisement has received a good response, then the OSP server 130 prompts the client applications 110 of users of the same or similar demographic category to interrupt the respective advertisement play lists (step 825). The subject advertisement is then displayed to the users as a real time advertisement for a predetermined time span (step 830). The subject advertisement may or may not be in the interrupted play lists.

In lieu of interrupting the users' play lists and displaying the subject advertisement in the regular client window 200, the subject advertisement may be prominently displayed in a separate, specially-reserved window on the display device 101. The separate window is preferably a unique color or shape with respect to the other displayed windows to increase its prominence. The window could include a banner that refers to the strong performance of the advertisement with other, similar users and thereby entices the user to click on the advertisement. For example, the banner could read, "Click here to join the hype" or "Get in on the excitement."

In any event, the separate window is preferably only used in limited circumstances to preserve the novelty of the window and thereby increase the likelihood of attracting a user's attention. Toward this end, the separate window is preferably used a maximum number of times per week or month for each user and only for a limited time span.

After the subject advertisement has been displayed for the predetermined time span, the client application 110 continues with the play list of each individual user (step 835). The play list preferably continues from the point at which it was interrupted. The advertisement that was interrupted may be redisplayed for its entire time span allotment. Alternately, the interrupted advertisement may be displayed for the remaining time allotment from the point at which it was interrupted so that the play list is essentially paused while the real time advertisement is displayed. In another alternative, the client application 110 of each user may prompt the OSP server 130 to compile a new, updated play list for the user after the play list has been interrupted. The process is then complete (step 840).

Strong performance is just one criterion for transmitting an advertisement as a real time advertisement. Other criteria could also be used. For example, the method shown in FIG. 8 could also be used where the subject advertisement is a poorly-performing advertisement in an attempt to increase user interaction with the advertisement. The method is preferably initiated if it is determined that advertisement is performing poorly, such as if the advertisement receives less than a minimum quantity of click-throughs from its target audience.

In the case of poorly-performing advertisements, the subject advertisement is preferably automatically sent to users of randomly-selected demographic categories as well as users of the specified target audience. This allows the advertiser to test the poorly-performing subject advertisement with new audiences and, if necessary, modify the advertisement's target criteria. The subject advertisement could include a special banner or title that entices the user to click on the subject advertisement and preferably increase the subject advertisement's performance with users.

The client application 110 preferably also receives from the OSP server 130 a match list. The match list comprises one or more match objects. The match objects each comprise an activity identifier and an ad object. The match list guides the client application 110 to display certain advertisements notwithstanding the play list. The activity identifier may comprise a resource locator, keyword, or parts and combinations thereof which are used for targeting advertising to the user. The activity identifier may also be an object which altogether describes an online activity in which the user may become involved, such as email or chat.

Figure 9:
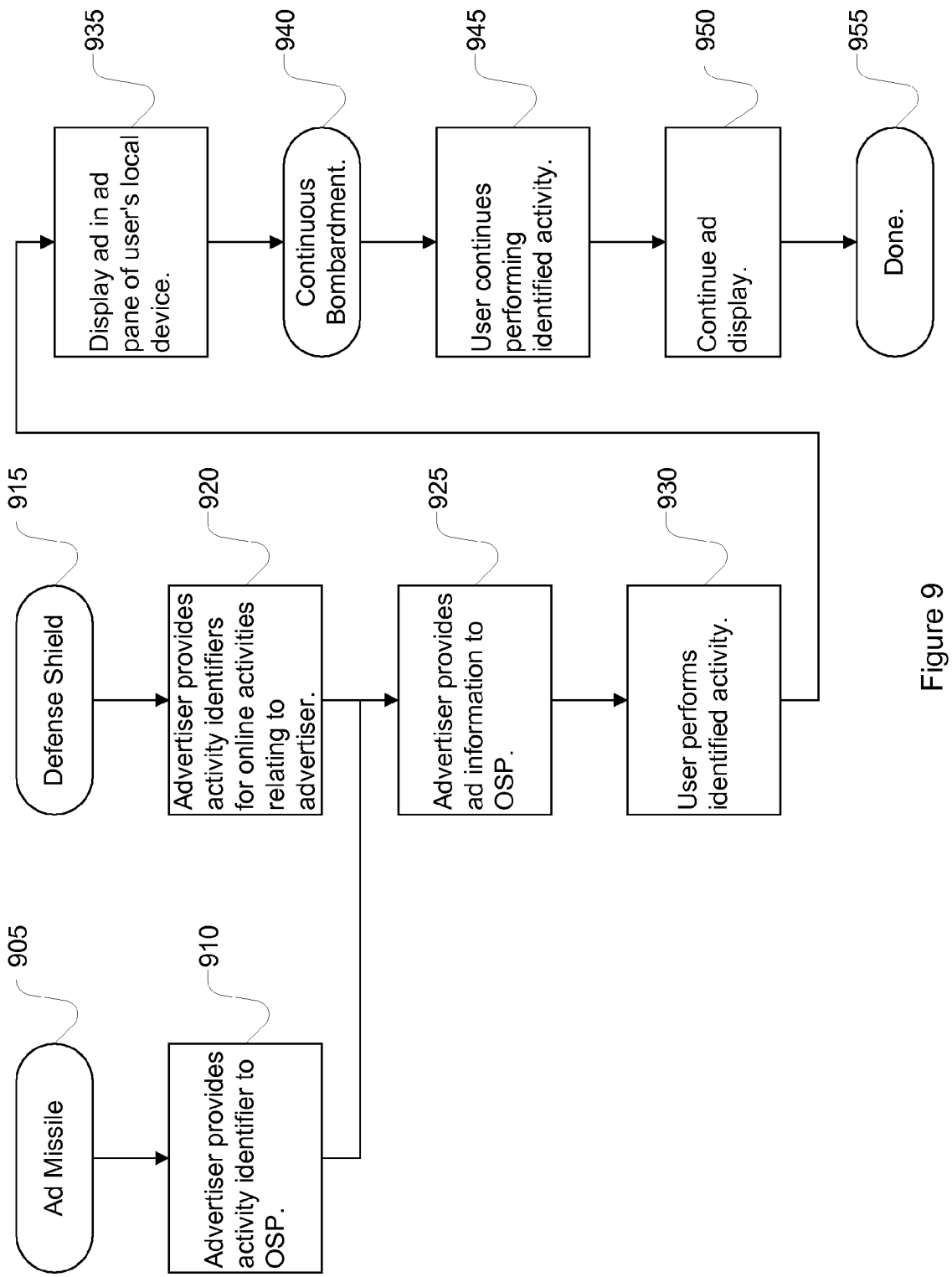
FIG. 9 is a flow chart of a method of sending targeted advertisements to a user.

Referring now to FIG. 9, the use of the match list for targeted advertising is described in conjunction with three aspects of the invention: "ad missiles," "defense shield," and "continuous bombardment." Ad missiles are provided for advertisers to send advertisements to users when those users are browsing competitors' web sites. The advertisements are displayed for a predetermined time span. The defense shield is provided as a defensive mechanism—a first advertiser can prevent other advertisers from sending ad missiles to users browsing the first advertiser's web site. In continuous bombardment, the advertiser selects a program of ad missiles for occasions when the user continues browsing the competitor's web site in case the user is browsing the site for longer than the amount of time that the ad missile is displayed. These are examples of the application of the ad missile, air defense shield and continuous bombardment technologies. The utility of these technologies, however, clearly transcends these exemplary applications.

The sending of an ad missile (step 905) begins with a given advertiser providing an activity identifier to the OSP (step 910). Preferably, this is achieved through an online means, such as through a web site dedicated to advertiser provisioning. Alternatively, the OSP could approach advertisers with activity identifiers created by the OSP, the OSP offering the activity identifiers to the advertisers. In addition to targeting competitors' web sites, the ad missile can be used to send ads to users browsing web sites from which the advertiser has inferred that the users might be interested in the advertiser's products and services. This is also sometimes referred to as "affinity targeting" by the inventors.

In the case of the defense shield (step 915), the advertiser provides activity identifiers for online activities relating to the advertiser (step 920).

Whether the advertiser is programming ad missiles or an air defense shield, the advertiser also programs the advertisements to send (step 925). Preferably, the advertiser provides a resource locator for the advertisement.

During the users' sessions with the online service, the client application 110 of each user preferably monitors the users' interaction with the data access network 120. Eventually, a given user's online activity matches a programmed activity identifier (step 930). Methods for monitoring the online activities of an online user are described in the related applications referenced above.

The ad display process of the client application 110 then displays the advertisement of the ad object corresponding to the matched activity identifier (step 935).

Continuous bombardment (step 940) can be viewed as a special case of ad missals and the air defense shield. It is preferably used where the user continues to perform the identified activity for a time span longer than the time span that a single ad missile is displayed. In steps 910 and 920 for ad missiles and steps 915 and 920 for air defense shield, the advertiser programs one or a series of advertisements to display to a user so long as a single activity identifier is matched. Thus, so long as the user continues to perform the identified activity (step 945), the client application 110 continues displaying the advertiser's program of advertisements (step 950). By selecting an appropriate activity identifier, an advertiser can ensure appropriate coverage and ad targeting. For example, a desirable activity identifier for continuous bombardment might be a second level domain name.

Once the user has discontinued performing the activity of the advertiser's activity identifier, then the client application 110 preferably returns to playing advertisements from the play list (step 955).

As an example of the use of the match list, consider the case of a user pointing his browser application 160 to a Web site which relates to sale of automobiles. This is indicative that the user has interest in automobiles, perhaps an interest in a particular brand of automobiles, and perhaps an interest in parts or service for that automobile. This user thus represents a desirable target audience for many different advertisers. If the user were browsing Ford's Web site, then General Motors might want to send an ad missile to the user. A lender, such of Citicorp, might want to send an affinity ad to the user alerting the user of financing options. On the other hand, Ford would want to prevent its Web site from being so targeted, and would establish a defense shield over its Web site.

As another example, the user might go to a search engine which is known to the online service provider, and search for information about the sale of automobiles based upon the keywords "automobile sales." The client application 110 preferably checks if the keywords sent to these selected search engines are activity identifiers in the match list. If so, then the client application 110 preferably displays the appropriate advertisement.

Preferably, activity identifiers are not limited to domain names. Activity identifiers preferably include keywords entered into search engines, and the use of a particular application on the local device 100. For example, an automobile financier could target users who enter the search term "automobile loan" into a search engine such as LookSmart, Yahoo or Excite. As another example, Microsoft could target users of Netscape and Eudora email software.

The local device 100 preferably maintains a targeted activity list comprised of a local file that contains one or more targeted activity identifiers and an associated play list of advertisements for each activity identifier. The play list preferably comprises one or more ad objects comprised of a resource locator for a given advertisement and a resource locator for a click-through associated with the given advertisement. Targeted activity identifiers comprise identifiers that describe a user activity for which advertisement play lists are played when the activity occurs. The local device 100 is preferably configured to store the targeted activity list in a local data store and also within a cache memory for quick access. A cache memory comprises a bank of high speed memory that is set aside for frequently accessed data.

In one embodiment, the targeted activity list comprises the activity identifiers that represent the greatest activity for a user on the local device for a given time period. For example, if the activity identifiers comprise URLs, the targeted activity list would contain the URLs that were accessed the greatest number of times within a given time period. In other words, the list would be a list of "top visited URLs" for a user of the local device and the play list associated with each of the top visited URLs. The local device 100 could also contain separate list of all the activity identifiers associated with the user. For example, the local device 100 could maintain a file that contains all of the URLs that the user visited within a given time period or all of the keywords that the user accessed.

Preferably, the OSP server 130 maintains a master targeted activity identifier list comprised of a file that contain all possible targeted activity identifiers and the play list(s) associated with each targeted activity identifier. The master targeted activity list preferably comprises at least one match object comprising a targeted activity identifier and plural ad objects, each ad object comprising a resource locator for a given advertisement and a resource locator for a click-through associated with the given advertisement. In one embodiment, the master targeted activity identifier list comprises a file that contains all targeted URLs and the play list(s) associated with each URL. The master targeted activity list may be stored in a data store. Preferably, the OSP server 130 also stores the master targeted activity identifier list in a cache memory for fast access.

Figure 10:
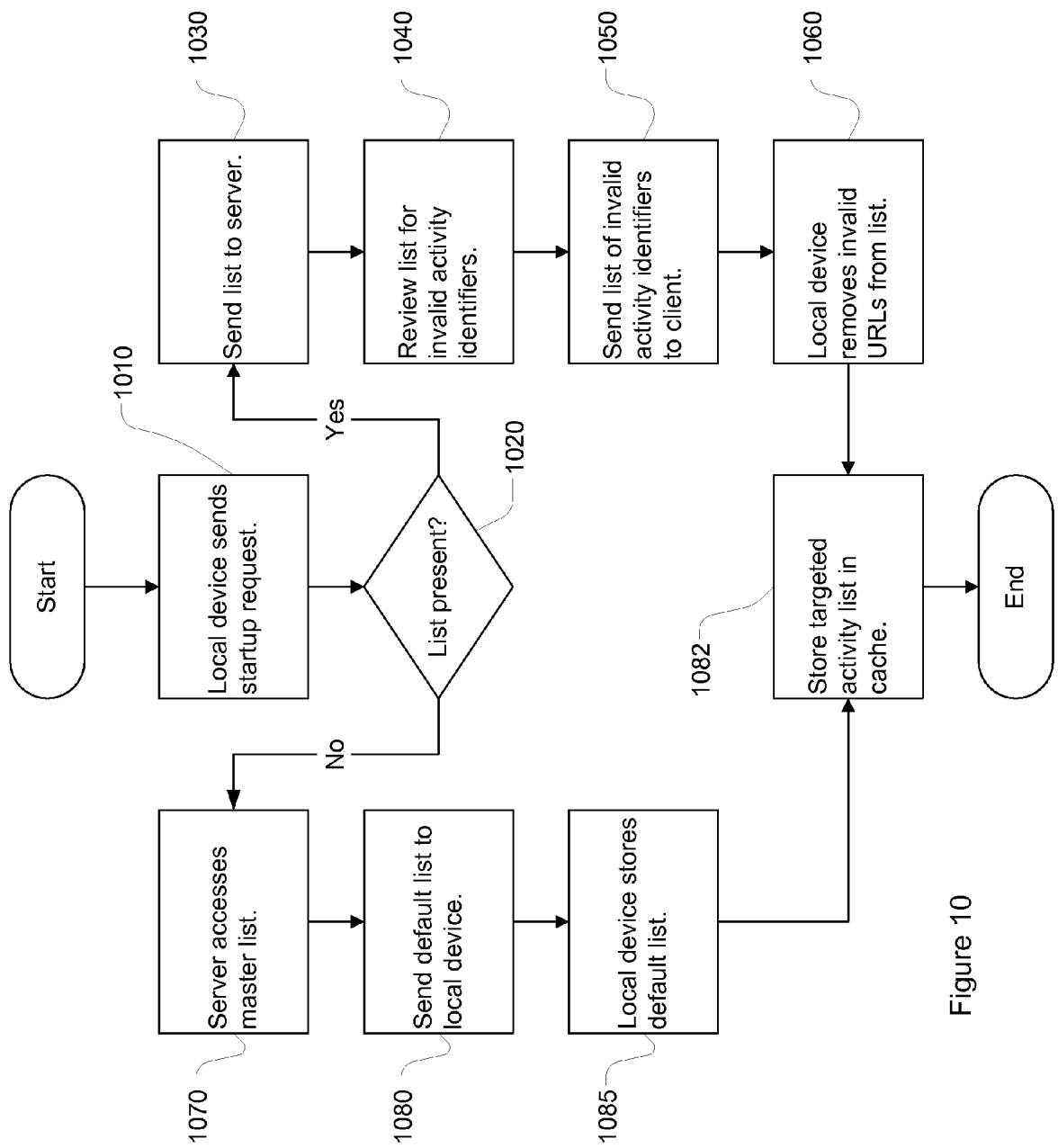
FIG. 10 is a flow chart that describes a process by which a local device and a OSP server interact to obtain and display predetermined advertisement play lists.

FIG. 10 shows a flow chart that describes a process by which the local device and the OSP server 130 interact to display predetermined advertisement play lists. The advertisement play lists are preferably displayed in response to the user of the local device conducting an action that matches a targeted activity identifier. In step 1010, the local device 100 sends a request to the OSP server to establish an online session. This may occur automatically when the client application is opened. Upon such a request, the local device 100 preferably determines whether a targeted activity list is contained in the local device, either in a local store or in cache memory (step 1020).

If a targeted activity list is contained in the local device 100, the local device 100 preferably sends some form of the targeted activity list to the OSP server 130 (step 1030). The form may be the actual targeted activity list. Alternately, the form may be identifiers of the targeted activities and identifiers of the play list associated with the targeted activities.

The OSP server 130 examines the targeted activity list upon receipt to determine whether the list contains any invalid activity identifiers (step 1040). Invalid activity identifiers comprise activity identifiers for which it is undesirable to play an advertisement list when the user commits an action associated with that activity identifier. For example, an invalid activity identifier may be an activity identifier for which there is simply no associated play list of advertisements. An invalid activity identifier may also comprise an activity identifier for which it is undesirable to commence a play list when the activity associated with the identifier is performed. For example, the activity identifier may comprise a URL associated with a pornographic web site. In such a case, it may be undesirable to play an advertisement play list when the user accesses the web site using the URL.

The OSP server then preferably identifies any invalid activity identifiers within the targeted activity list of the local device and sends a list of the invalid activity identifiers to the local device 100 (step 1050). Preferably, the local device 100 then removes the invalid activity identifiers from the targeted activity list (step 1060).

Returning to step 1020, the local device 100 may not have a targeted activity list stored locally. In such a case, the OSP server 130 will not receive a targeted activity list from the local device 100. The OSP server 130 then accesses the master targeted activity identifier list (step 1070). The OSP server 130 then sends a default targeted activity identifier list to the local device 100 (step 1080). The default list may comprise all or a portion of the master targeted activity identifier list. The local device 100 preferably stores the default list as its new targeted activity list in a local data store (step 1085).

In step 1082, the local device 100 commences formation of a targeted activity list in cache memory of the local device. Preferably, the local device stores the targeted activity list in local cache memory. The list that is stored in cache memory preferably does not contain any invalid activity identifiers. Because the targeted list is stored within cache memory, the local device 100 is able to quickly access the list when the user interacts with the data access network 120.

Figure 11:
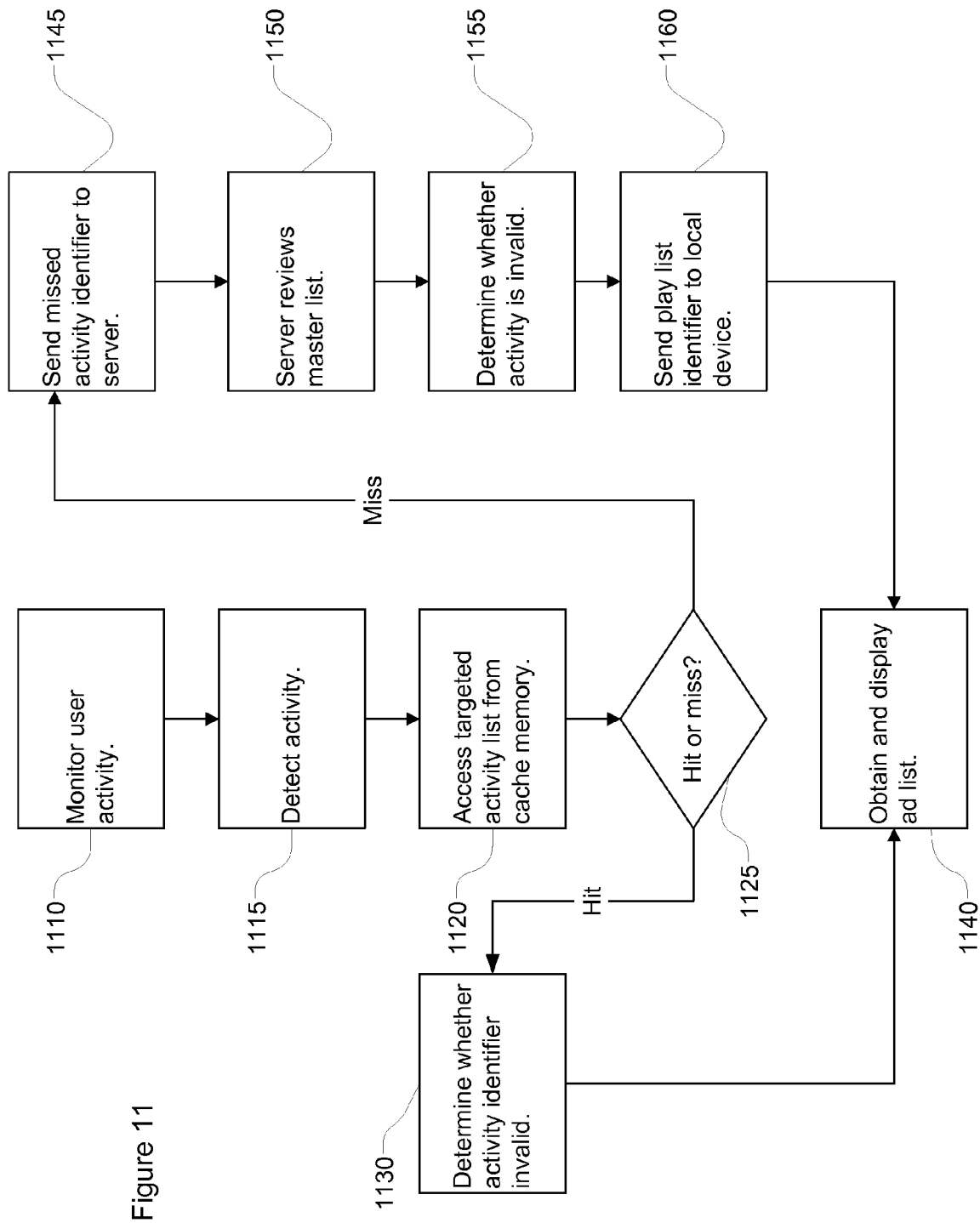
FIG. 11 is a flow chart that describes a process by which the local device and the server fetch and play advertisement play lists when a user performs a targeted activity.

FIG. 11 shows a flow chart that describes a process by which the local device 100 and/or the OSP server 130 fetch and play advertisement play lists when the user performs a targeted activity. In step 1110, the local device 100 monitors the user's activity with the data access network. The activity may be monitored in any of a wide variety of ways. In one embodiment, the local device monitors any URLs that the user accesses using the browser application. The local device could also monitor search words or key words that are used when searching the data access network 120.

In step 1115, the local device 100 detects that the user has performed an activity. For example, the local device 100 may detect that the user has accessed a web site associated with a uniform resource locator. The local device 100 preferably then accesses the targeted activity list from the cache memory of the local device 100 (step 1120). As mentioned, the targeted activity list comprises a plurality of match objects each comprising an activity identifier such as a uniform resource locator and an advertisement play list corresponding to the activity identifier.

Next, in step 1125, the local device 100 determines whether the user activity matches one of the activity identifiers in the targeted activity list. In the example of the activity identifier being a uniform resource locator, the local device determines whether the accessed uniform resource locator matches one of the uniform resource locators in the targeted activity list. The local device 100 essentially determines whether a "hit" or a "miss" has occurred. A "hit" occurs when the user's activity matches one of the activity identifiers in the cached targeted activity list. A "miss" occurs when the user's activity does not match any of the activity identifiers in the targeted activity list. For example, if the activity identifiers comprise URLs, a hit will occur if the accessed URL is present in the targeted activity list. A miss occurs when the targeted URL is not present in the targeted activity list.

As mentioned, the targeted activity list may comprise a list of the top performed activities for the user. In such a case, the likelihood of a hit occurring is maximized. Advantageously, the use of the cached targeted activity list and the use of a top performing activity list reduces the amount of time to identify targeted activities and the associated play lists.

If a hit occurs, the local device 100 determines whether the user's activity is an invalid activity (step 1130). The local device may have a list of invalid activities or may analyze the activity identifier to determine if the activity is invalid. For example, if the activity comprises the user accessing a URL, the local device may parse the accessed URL and search for invalid words. If the activity is not invalid, then the local device obtains from the targeted activity list the advertisement play list associated with the matched activity identifier. The local device 100 then causes the advertisement play list to be played (step 1140).

If the user's activity does not match one of the activity identifiers in the targeted activity list, then a miss has occurred. If so, the local device 100 sends an activity identifier associated with the missed activity to the OSP server 130 (step 1145). For example, if the activity were accessing a URL, the local device 100 would send the accessed URL to the OSP server 130. The local device 100 could also store the missed activity identifier into a local file that contains a list of missed activity identifiers.

In step 1150, the OSP server 130, after receiving the missed activity identifier, reviews the master targeted activity identifier list to determine whether the missed activity identifier is a targeted activity identifier. If the missed activity identifier is a targeted activity identifier, the OSP server 130 determines whether it is an invalid activity identifier, as described above in step 1130 with respect to the local device 100 (step 1155). If so, the OSP server preferably instructs the local device 100 that the activity identifier is invalid.

If the activity identifier is not invalid and is a targeted activity identifier, the OSP server 130 preferably sends the client device a notification of the play list that is associated with the targeted activity identifier (step 1160). The OSP server 130 preferably obtains the play list from the master targeted activity identifier list that is accessible from the OSP server 130. The local device 100 then receives from the OSP server 130 the advertisement play list associated with the accessed uniform resource locator and causes the play list to be played (step 1140).

Preferably, the local device also revises its targeted activity list to include a new match object comprised of the missed activity identifier and the play list associated with the missed activity identifier. If the activity identifier comprised a URL, for example, the local device 100 inserts the missed URL and the advertisement play list corresponding to the missed URL into the targeted activity list for the user. In this manner, the targeted activity list evolves into a personalized targeted activity list for the user of the local device 100.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method comprising:
   maintaining on a server a master activity identifier list comprising at least one match object having a targeted activity identifier and an ad object for each of a plurality of advertisements;
   receiving at the server a request from a local device to initiate an online session, wherein the request includes a targeted activity list comprised of one or more activity identifiers and one or more ad objects associated with each activity identifier;
   determining at the server that at least one of the activity identifiers in the targeted activity list is an invalid activity identifier;
   the server notifying the local device of the invalid activity identifiers in the targeted activity list thereby causing the local device to take at least one action.

2. The method of claim 1, wherein the server notifying comprises:
   the server causing the local device to remove the invalid activity identifiers from the targeted activity list.

3. The method of claim 2, wherein the server notifying further comprises:
   the server causing the local device to create a modified targeted activity list.

4. The method of claim 3, wherein the server notifying further comprises:
   the server causing the local device to store the modified targeted activity list.

5. The method of claim 1, wherein the activity identifiers comprise uniform resource locators.

6. The method of claim 1, wherein the activity identifiers comprise keywords.

7. The method of claim 1, wherein the determining comprises:
   the server comparing each activity identifier in the targeted activity list to the activity identifiers in the master activity identifier list.
   the server identifying a non-present activity identifier as invalid if an activity identifier in the targeted activity list is not present in the master activity identifier list.

8. The method of claim 1 further comprising:
   the server maintaining a list of prohibited activity identifiers
   the server determining whether the targeted activity list contains any prohibited activity identifiers.

9. The method of claim 8, wherein activity identifiers that relate to pornographic material are considered prohibited activity identifiers.

10. A server having software which when executed causes the server to perform operations comprising:
    maintaining a master activity identifier list comprising at least one match object comprising a targeted activity identifier and an object for each of a plurality of advertisements;
    receiving a request from a local device to initiate an online session, wherein the request includes a targeted activity list comprised of one or more activity identifiers and one or more ad objects associated with each activity identifier;
    determining that at least one of the activity identifiers in the targeted activity list is an invalid activity identifier;
    notifying the local device of the invalid activity identifiers in the targeted activity list thereby causing the local device to take at least one action.

11. The server of claim 10, wherein the notifying further comprises:
    causing the local device to remove the invalid activity identifiers from the targeted activity list maintained by the local device.

12. The server of claim 11, wherein the notifying further comprises:
    causing the local device to create a modified targeted activity list.

13. The server of claim 12, wherein the notifying further comprises:

causing the local device to store the modified targeted activity list.

14. The server of claim 10, wherein the activity identifiers comprise uniform resource locators.

15. The server of claim 10, wherein the activity identifiers comprise keywords.

16. The server of claim 10, wherein the determining comprises:

comparing each activity identifier in the targeted activity list to the activity identifiers in the master activity identifier list;

identifying a nonpresent activity identifier as invalid when an activity identifier in the targeted activity list is not present in the master activity identifier list.

17. The server of claim 10, having further software which when executed causes the server to perform further operations comprising:

maintaining a list of prohibited activity identifiers;

wherein the determining comprises evaluating whether the targeted activity list contains any prohibited activity identifiers.

18. The server of claim 17, wherein activity identifiers that relate to pornographic material are considered prohibited activity identifiers.

* * * * *